(12) United States Patent
Al-Munif et al.

(10) Patent No.: US 8,901,271 B2
(45) Date of Patent: Dec. 2, 2014

(54) PROCESS FOR MAKING POLYETHYLENE TEREPHTHALATE

(75) Inventors: Munif Al-Munif, Riyadh (SA);
Mummaneni Venkateswara Rao, Riyadh (SA); Zahir Bashir, Riyadh (SA); Suresh Padmanabhan, Riyadh (SA)

(73) Assignee: Saudi Basic Industries Corporation, Riyadh (SA)

( * ) Notice: Subject to any disclaimer, the term of this patent is extended or adjusted under 35 U.S.C. 154(b) by 91 days.

(21) Appl. No.: 13/391,432

(22) PCT Filed: Aug. 17, 2010

(86) PCT No.: PCT/EP2010/005115
§ 371 (c)(1),
(2), (4) Date: Feb. 21, 2012

(87) PCT Pub. No.: WO2011/020619
PCT Pub. Date: Feb. 24, 2011

(65) Prior Publication Data
US 2012/0161358 A1  Jun. 28, 2012

(30) Foreign Application Priority Data
Aug. 20, 2009  (EP) ..................................... 09075379

(51) Int. Cl.
*C08G 63/00* (2006.01)
*C08G 63/85* (2006.01)

(52) U.S. Cl.
CPC ...................................... *C08G 63/85* (2013.01)
USPC ........... 528/275; 528/272; 528/279; 528/281; 528/285; 528/286; 502/102; 502/103

(58) Field of Classification Search
CPC .............................. C08G 63/183; C08G 63/85
USPC ........ 528/271–308.3; 502/102, 103, 104, 208
See application file for complete search history.

(56) References Cited

U.S. PATENT DOCUMENTS

| | | |
|---|---|---|
| 3,404,121 A | 10/1968 | Barkey |
| 3,907,754 A | 9/1975 | Tershansy et al. |
| 3,929,728 A | 12/1975 | Chimura et al. |
| 3,962,189 A | 6/1976 | Russin et al. |
| 4,010,145 A | 3/1977 | Russin et al. |
| 4,064,112 A | 12/1977 | Rothe et al. |
| 4,146,729 A | 3/1979 | Goodley et al. |
| 4,161,578 A | 7/1979 | Herron |
| 4,356,299 A | 10/1982 | Cholod et al. |
| 4,361,694 A | 11/1982 | Weinberg et al. |
| 5,008,230 A | 4/1991 | Nichols |
| 5,017,680 A | 5/1991 | Sublett |
| 5,162,488 A | 11/1992 | Mason |
| 5,166,311 A | 11/1992 | Nichols |
| 5,340,907 A | 8/1994 | Yau et al. |
| 5,384,377 A | 1/1995 | Weaver et al. |
| 5,608,032 A | 3/1997 | Yuo et al. |
| 5,623,047 A | 4/1997 | Yuo et al. |
| 5,760,119 A | 6/1998 | Rafler et al. |
| 5,981,690 A | 11/1999 | Lustig et al. |
| 6,080,834 A | 6/2000 | Putzig et al. |
| 6,133,404 A | 10/2000 | Kang et al. |
| 6,316,584 B1 | 11/2001 | Seidel et al. |
| 6,489,433 B2 | 12/2002 | Duan et al. |
| 2005/0148758 A1 | 7/2005 | Putzig et al. |

FOREIGN PATENT DOCUMENTS

| | | |
|---|---|---|
| DE | 19537930 A1 | 4/1997 |
| EP | 0399742 A2 | 11/1990 |
| EP | 0812818 A1 | 12/1997 |
| EP | 1270640 A1 | 1/2003 |
| EP | 1574539 A1 | 9/2005 |
| EP | 1506248 B1 | 11/2006 |
| GB | 1236477 | 6/1971 |
| GB | 2398073 A | 8/2004 |
| JP | 55149320 A | 11/1980 |
| JP | 56008431 A | 1/1981 |
| JP | 2155920 A | 6/1990 |
| JP | 7145233 A | 6/1995 |
| JP | 8027262 A | 1/1996 |
| JP | 11209464 A | 8/1999 |
| JP | 2000226446 A | 8/2000 |
| JP | 2001081170 A | 3/2001 |
| JP | 2001098064 A | 4/2001 |
| JP | 2002241479 A | 8/2002 |

(Continued)

OTHER PUBLICATIONS

Machine translation of JP 2000-226446.*
Office translation of JP 2000-226446.*
Japanese Patent No. 11209464 (A); Publication Date: Aug. 3, 1999; Abstract Only; 1 Page.
German Patent No. 19537930 (A); Publication Date: Apr. 17, 1997; Abstract Only; 1 Page.
Japanese Patent No. 2000226446 (A); Publication Date: Aug. 15, 2000; Abstract Only; 1 Page.
Japanese Patent No. 2001081170 (A); Publication Date: Mar. 27, 2001; Abstract Only; 1 Page.
Japanese Patent No. 2001098064 (A); Publication Date: Apr. 10, 2001; Abstract Only; 1 Page.

(Continued)

*Primary Examiner* — Frances Tischler
(74) *Attorney, Agent, or Firm* — Cantor Colburn LLP

(57) ABSTRACT

The invention relates to a process for making polyethylene terephthalate (PET) from ethylene glycol (EG), purified terephthalic acid (PTA) and optionally up to 6 mol % comonomer, using a mixed metal catalyst system and comprising the steps of a) esterifying EG and PTA to form diethyleneglycol terephthalate and oligomers (DGT), and b) melt-phase polycondensing DGT to form PET and EG, wherein the catalyst system substantially consists of 70-160 ppm of Sb-compound, 20-70 ppm of Zn-compound, and 0.5-20 ppm of Ti-glycolate as active components (ppm metal based on PET). With this process that applies reduced amount of metal catalyst components PET can be obtained with high productivity, which polyester shows favorable color and optical clarity, also if recycling of EG is applied within the process.

18 Claims, No Drawings

(56) References Cited

FOREIGN PATENT DOCUMENTS

| | | | |
|---|---|---|---|
| JP | 2003171453 A | 6/2003 | |
| JP | 2004107383 A | 4/2004 | |
| JP | 2004217887 A | 8/2004 | |
| JP | 2004346222 A | 12/2004 | |
| JP | 2005179592 A | 7/2005 | |
| JP | 2005272784 A | 10/2005 | |
| JP | 2005350506 A | 12/2005 | |
| WO | 9747675 A1 | 12/1997 | |
| WO | 9916537 A1 | 4/1999 | |
| WO | 2004065452 A1 | 8/2004 | |
| WO | 2004076513 A2 | 9/2004 | |
| WO | 2005118676 A1 | 12/2005 | |
| WO | 2007126855 A1 | 11/2007 | |
| WO | 2008008813 A2 | 1/2008 | |

OTHER PUBLICATIONS

Japanese Patent No. 2002241479 (A); Publication Date: Aug. 28, 2002; Abstract Only; 1 Page.
Japanese Patent No. 2003171453 (A); Publication Date: Jun. 20, 2003; Abstract Only; 1 Page.
Japanese Patent No. 2004107383 (A); Publication Date: Apr. 8, 2004; Abstract Only; 1 Page.
Japanese Patent No. 2004217887 (A); Publication Date: Aug. 5, 2004; Abstract Only; 1 Page.
Japanese Patent No. 2004346222 (A); Publication Date: Dec. 9, 2004; Abstract Only; 1 Page.
Japanese Patent No. 2005179592 (A); Publication Date: Jul. 7, 2005; Abstract Only; 1 Page.
Japanese Patent No. 2005272784 (A); Publication Date: Oct. 6, 2005; Abstract Only; 1 Page.
Japanese Patent No. 2005350506 A); Publication Date: Dec. 22, 2005; Abstract Only; 1 Page.
Japanese Patent No. 2155920 (A); Publication Date: Jun. 15, 1990; Abstract Only; 2 Pages.
Japanese Patent No. 55149320 (A); Publication Date: Nov. 20, 1980; Abstract Only; 1 Page.
Japanese Patent No. 56008431 (A); Publication Date: Jan. 28, 1981; Abstract Only; 1 Page.
Japanese Patent No. 7145233 (A); Publication Date: Jun. 6, 1995; Abstract Only; 1 Page.
Japanese Patent No. 8027262 (A); Publication Date: Jan. 30, 1996; Abstract Only; 1 Page.
European Search Report; European Application No. 09075379.9; Date of Mailing: Jan. 18, 2010; 4 Pages.
International Search Report; International Application No. PCT/EP2010/005115; International Filing Date: Aug. 17, 2010; Date of Mailing: Sep. 29, 2010; 7 Pages.
Written Opinion of the International Searching Authority; International Application No. PCT/EP2010/005115; International Filing Date: Aug. 17, 2010; Date of Mailing: Sep. 29, 2010; 4 Pages.
Shah et al.; "Aspects of the Chemistry of Poly(ethylene terephthalate): 5. Polymerization of Bis(hydroxyethyl) terephthalate by Various Metallic Catalysts"; Polymer; vol. 25; Sep. 1984; pp. 1333-1336.
Tomita; "Studies on the Formation of Poly(ethylene terephthalate): 6. Catalytic Activity of Metal Compounds in Polycondensation of Bis(2-hydroxyethyl) Terephthalate"; Polymer; vol. 17; Mar. 1976; pp. 221-224.
Aharoni, S.M.; Industrial-Scale Production of Polyesters, Especially Poly(ethylene terephthalate); Handbook of Thermoplastic Polymers: Homopolymers, Copolymers, Blends, and Composites; Chapter 2; 2002; pp. 59-103.
Billmeyer Jr., Fred W.; "Methods for Estimating Intrinsic Viscosity"; Journal of Polymer Science; Volum IV; 1949; pp. 83-86.
Fourne, Franz; "Synthetic Fibers: Machines and Equipment, Manufacture, Properties"; Handbook for Plant Engineering, Machine Design, and Operation; Chapter 2.3: Polyester (PES); 1999; 3 Pages.
Gupta et al.; "PET Fibers, Films, and Bottles"; Handbook of Thermoplastic Polyesters; Chapter 7; 2002; pp. 317-388.

\* cited by examiner

PROCESS FOR MAKING POLYETHYLENE TEREPHTHALATE

CROSS REFERENCE TO RELATED APPLICATIONS

This application is a 371 of International Application No. PCT/EP2010/005115, filed Aug. 17, 2010, which claims priority to European Application No. 09075379.9, filed Aug. 20, 2009, both of which are hereby incorporated by reference in its entirety.

TECHNICAL FIELD

The invention relates to a process for making polyethylene terephthalate (PET) from ethylene glycol (EG), purified terephthalic acid (PTA) and optionally up to 6 mol % comonomer, using a mixed metal catalyst system containing antimony and zinc, and comprising the steps of a) esterifying EG and PTA to form diethyleneglycol terephthalate and oligomers (DGT), and b) melt-phase polycondensing DGT to form PET and EG.

BACKGROUND

Such a process is for example known from patent application EP1574539A1. This document describes a process for making PET wherein PTA and EG are reacted in the presence of a catalyst system consisting of 15-150 ppm of Sb-compound and 40-160 ppm of Zn-compound as active catalyst components and 10-30 ppm of phosphoric acid as stabilizing component (ppm based on PET). Compared with a typical standard Sb-catalyst, this catalyst system is indicated not only to increase productivity in both melt-phase polycondensation and in a subsequent solid-phase polycondensation (SSP) step, but also to enhance optical properties of the PET; i.e. moulded product shows improved clarity and reduced greyish colour than standard Sb-based PET, which is generally ascribed to presence of Sb-catalyst residues. In order to obtain sufficiently fast reactions, the catalyst system is used at a concentration resulting in total metal content of the PET obtained of typically higher than 200 ppm.

Polyesters like PET are well-known in the art, and are widely applied in applications like textile and industrial fibres, films and sheets, and containers, especially bottles. Initial PET production employed dimethyl terephthalate (DMT) and ethylene glycol (also called monoethylene glycol; EG) as precursors, but nowadays production plants generally use purified terephthalic acid (PTA) and EG as raw materials, because of process economic reasons. In this case, first an oligomer or low molecular mass prepolymer is formed by esterification of PTA with a molar excess of EG to form diethyleneglycol terephthalate (also called bis hydroxyethyl terephthalate) and oligomers thereof (together referred to hereinafter as DGT), with water being the main by-product distilled off (step a)). This step is generally self-catalysed, but may be accelerated by adding catalyst. DGT is further subjected to polycondensation by transesterification reactions to form higher molecular mass polyester (step b)). In this step, DGT is heated to about 280° C. under high vacuum to carry out the melt-phase polycondensation with removal of EG liberated in the polycondensation reaction. Because the trans-esterification is a slow reaction, the polycondensation step is generally catalysed. This catalyst can be added in step b), but it can also already be included in step a). The melt is discharged and made into pellets after it reaches a desired molecular mass, reflected by intrinsic viscosity (IV) values.

Commercial-scale PET production is generally based on a continuous PTA system employing several reactors in series, as described for example by S. M. Aharoni in "Handbook of Thermoplastic Polyesters", vol. 1, chapter 2, Editor S. Fakirov, Wiley-VCH, 2002; and by V. B. Gupta and Z. Bashir in "Handbook of Thermoplastic Polyesters", vol. 1, chapter 7, Editor S. Fakirov, Wiley-VCH, 2002. Typically, such a system includes a vessel in which EG, PTA, catalyst and additives are mixed to form a paste; one or more esterification reactors; one or more pre-polycondensation reactors, followed by a high-vacuum, finisher reactor for the final stages of polycondensation. The polyester formed may be extruded into strands, quenched under water and cut to form pellets or chips. PET used in film and fibre applications typically has an IV in the range of 0.55 to 0.65 dL/g; PET films and fibres can also be produced directly by extruding the melt from the polycondensation reactor. For PET bottle grade resin, polymers with IV in the range of 0.75 to 0.85 dL/g, and having low residual acetaldehyde are generally required. In this case, a split process is used to attain this IV value while attaining a low amount of acetaldehyde. The general practice is to make polymer chips with an intermediate IV of about 0.63 dL/g by melt-polycondensation, and then increase the IV by subsequent solid-state polycondensation (SSP). This split procedure allows production of a high IV resin with minimal quantities of acetaldehyde, which is a degradation by-product that affects the taste of beverages packed in PET bottles. Diethylene glycol (DEG) is a diol generated from ethylene glycol via a side-reaction and is also incorporated in the PET chain. Presence of DEG as comonomer reduces the glass transition and melting temperature of the PET, but too high levels are undesirable. The melt-phase and SSP technology is described for example in Encyclopaedia of Polymer Science and Engineering, $2^{nd}$ ed, volume 12, John Wiley and Sons, New York (1988), and in "Handbook of Thermoplastic Polyesters", vol. 1, chapter 7, Editor S. Fakirov, Wiley-VCH, 2002.

In the literature many different metal-based catalysts have been reported to be suitable for polyester and especially for PET production. The activity as catalyst for the polycondensation reaction of various metals on a molar basis follows the trend Ti>Sn>Sb>Mn>Zn>Pb; see for example F. Fourne, "Synthetic fibres", Hanser Verlag (1999), p. 67 ff. In selecting a catalyst, however, besides activity towards (trans-)esterification and polycondensation also its effect on undesirable side-reactions needs to be considered.

Relevant side-reactions during PET production include: (1) formation of acetaldehyde, which may affect taste of products packed in PET containers; (2) formation of COOH-endgroups, which affect hydrolytic and thermal stability of the polyester, and an unbalanced number of endgroups may limit molar mass increase; (3) formation of vinylester endgroups, which are not active towards polycondensation; (4) formation of diethyleneglycol (DEG); which is incorporated as comonomer; and (5) formation of chromophores; causing e.g. yellowing.

Although titanium is in principle the most active metal, the catalysts currently employed in more than 90% of industrial PET production are based on antimony (Sb) as they give the best balance in activity and polymer performance. Ti- and Zn-based systems generally result in e.g. too slow solid-state reactions, unacceptable yellowing, and/or high acetaldehyde generation. Typically, about 200-300 ppm Sb (mostly added as antimony acetates, oxides, or glycolates; ppm metal based on PET) is used to provide sufficiently fast reactions. Sb-based PET also shows some yellow discolouration, but this can be effectively masked by adding colour correction agents, like a Co-compound. A further disadvantage of using antimony-based catalysts is the slight greyish colour of PET that is reported to result from precipitation of antimony metal particles. In addition, antimony is rather expensive and subject to some environmental concerns. Increasing the amount of Sb present in PET to above about 300 ppm presents thus no advantages.

Various publications have addressed mixed metal catalysts systems for PET that enable lower amounts of antimony to be used, e.g. by combining Sb with a second or third metal compound to result in some synergistic effect. For example, U.S. Pat. No. 5,008,230 and U.S. Pat. No. 5,166,311 describe a tri-component catalyst based on antimony, 5-60 ppm of cobalt and/or zinc, and 10-150 ppm of zinc, magnesium, manganese or calcium. The catalyst would allow reducing melt-polycondensation times by at least one-third, compared to the conventional antimony catalyst. Other patent publications covering Sb—Zn catalyst compositions include U.S. Pat. No. 5,162,488, and EP0399742.

U.S. Pat. No. 5,623,047 states that the optical appearance of PET made with the PTA process can be improved by introducing alkali metal acetate as third component besides antimony and at least one of cobalt, magnesium, zinc, manganese and lead.

U.S. Pat. No. 5,608,032 discloses a catalyst system that contains 10-1000 ppm Sb, 10-500 ppm of at least one of Co, Mg, Zn, Mn, Ca and Pb, and 10-500 ppm of a P-compound. In U.S. Pat. No. 4,356,299 PET of relatively low IV and slightly yellow colour is made with a combination of 40-300 ppm Sb and 2-18 ppm Ti-compound.

A mixed metal catalyst containing 50-300 ppm Sb, 25-100 ppm Mn, 10-100 ppm Co and 20-60 ppm Ti from titanium alkoxide was used in U.S. Pat. No. 4,010,145 to make PET via DMT route.

U.S. Pat. No. 5,017,680 discloses a catalyst system for making PET via the DMT process, which contains 150-350 ppm Sb, 25-110 ppm Mn, Zn or Ca, 10-100 ppm Co, and 10-100 ppm Ti preferably as a complex of titanium alkoxide with an alkali or alkaline earth metal. In the experiments catalyst compositions are used that contain 200-220 ppm Sb, 50-60 ppm Mn, 18-21 ppm Ti, and 40-80 ppm Co as metal components; resulting in a polyester with a metal content of over 310 ppm.

In JP2000226446 bottle-grade PET is made with a catalyst system consisting of 12-207 ppm Sb, 2-300 ppm of at least one of Mg, Ca, Co, Mn, or Zn, 0-20 ppm Ti, 0-50 ppm Ge, and a basic nitrogen compound as essential components. The experiments apply Sb—Mg—Ti—N catalyst compositions. Use of a nitrogen compound in polyesters may have negative effects on colour and on organo-leptic properties.

WO2008/008813A2 describes a catalyst system that is especially suited to promote the SSP step in a process for making polyester like PET, which catalyst system comprises as active components 1) a coordination catalyst component selected from Ti, Ge, Sb and Al, 2) a strong acid component of certain pKa value, and 3) optionally a supplemental catalyst component selected from Co, Mn and Zn. Catalyst compositions with two or more metal components actually disclosed contain 7 ppm Ti/30 ppm Co; 240-250 ppm Sb/10-25 ppm Co; and 30 ppm Sb/150 ppm Ge/10 ppm Co; all three further containing 200-1000 ppm of strong acid.

There is, however, still a general need in the industry for an economical process for making PET from EG, PTA and optionally comonomer, using a mixed metal catalyst system that results in PET showing a good balance of mechanical and optical properties, and containing reduced amounts of metal residues, especially less heavy metals.

SUMMARY

It is therefore an objective of the present invention to provide such a process for making PET from EG, PTA and optionally comonomer.

DETAILED DESCRIPTION

This object is achieved according to the invention with the process as defined by the claims and in the description, more particularly with a process for making polyethylene terephthalate (PET) from ethylene glycol (EG), purified terephthalic acid (PTA) and optionally up to 6 mol % comonomer, using a mixed metal catalyst system and comprising the steps of a) esterifying EG and PTA to form diethylene glycol terephthalate and oligomers (DGT), and b) melt-phase polycondensing DGT to form PET and EG, wherein the catalyst system substantially consists of a Sb-compound, a Zn-compound and Ti-glycolate as active components, at concentration of 70-160 ppm Sb, 20-70 ppm Zn and 0.5-20 ppm Ti (ppm metal based on PET), respectively.

With the process according to the invention PET is obtained with high productivity at relatively low content of metal catalyst components, which PET shows superior colour and high optical clarity. Furthermore, EG that is formed in the process according to the invention can be recycled without imparting colour or reducing transparency. A further advantage is that the Sb—Zn—Ti catalyst composition according to the invention increases both esterification and polycondensation reaction rates, unlike known catalyst based on Sb- and/or Zn-compounds which merely affect polycondensation reactions. The PET obtained with the process according to the invention further has good thermal stability, shows a relatively low rate of acetaldehyde (AA) regeneration during melt-processing; and is thus eminently suited for making packaging articles, especially for packaging of food products, like soft-drink bottles having excellent mechanical, optical and organo-leptic properties.

It is true that GB 1236477 discloses a process for making PET wherein a mixed metal catalyst is applied that contains Sb, Zn and Ti, but in this DMT-based process the catalyst is made by adding particles of Sb, Zn and Ti metal to a monomer mixture, and Sb, Zn and Ti are used at different relative amounts. A Sb—Zn—Ti-based catalyst is also disclosed in JP2005350506, but this document relates to a process for making a rather different type of polyester, i.e. an aliphatic copolyester, for use in adhesive or paint applications.

In the process according to the invention for making PET from EG and PTA optionally up to 6 mol % of a comonomer can be used. PET is considered to be a thermoplastic polyester with a substantially linear polymer chain, optionally having some degree of branching, which can be melt-processed into shaped articles. The presence of comonomer will affect the crystallisation behaviour and the melting point of the polymer; as is known to a person skilled in the art. A high content of comonomer may result in copolyester that is substantially amorphous. Typically, an amount of comonomer is chosen that results in a crystallisable polyester, which can be melt-processed at somewhat lower temperature settings than homopolymer PET into products with high optical clarity, but which still results in a formed article—e.g. a stretch-blow moulded container—showing good mechanical properties (due to orientation-induced crystallisation). For this reason, the amount of comonomer used in the process according to the invention is preferably at least about 0.5, 1.0, or 1.5 mol %, but preferably at most about 5, 4 or 3 mol %.

In the process according to the invention for making PET from EG and PTA at least one comonomer may be used, and suitable comonomers can be selected from di- or polycarboxylic acids or their ester-forming derivatives, from di- or poly-hydroxy compounds or their ester-forming derivatives, from hydroxycarboxylic acids or their ester-forming derivatives, and from combinations thereof. Preferably, a di-functional compound is used as comonomer.

Suitable carboxylic acids include dicarboxylic acids of the formula HOOC—R—COOH, wherein R is a -linear or branched-alkylene group, an arylene group, an alkenylene group, or a combination thereof. Preferably, R has about 2 to 30, preferably about 4 to 15 carbon atoms. Suitable examples of carboxylic acid compounds include saturated aliphatic dicarboxylic acids such as oxalic acid, malonic acid, succinic acid, gluratic acid, adipic acid, pimelic acid, suberic acid, azelaic acid, sebacic acid, decanedicarboxylic acid, dodecanedicarboxylic acid, tetradecanedicarboxylic acid, hexadecanedicarboxylic acid, 1,3-cyclobutanedicarboxylic acid, 1,3-cyclopentanedicarboxylic acid, 1,2-cyclohexanedicarboxylic acid, 1,3-cyclohexanedicarboxylic acid, 1,4-cyclohexanedicarboxylic acid, 2,5-norbornanedicarboxylic acid, and dimeric acid; unsaturated aliphatic dicarboxylic acids such as fumaric acid, maleic acid, and itaconic acid; and aromatic dicarboxylic acid such as orthophthalic acid, isophthalic acid, 5-(alkali metal)sulfoisophthalic acid, diphenic acid, 1,3-naphthalenedicarboxylic acid, 1,4-naphthalenedicarboxylic acid, 1,5-naphthalenedicarboxylic acid, 2,6-naphthalenedicarboxylic acid, 2,7-naphthalenedicarboxylic acid, 4,4,-biphenyldicarboxylic acid, 4,4'-biphenylsulfonedicarboxylic acid, 4,4'-biphenyl ether dicarboxylic acid, 1,2-bis(phenoxy)ethane-p,p'-dicarboxylic acid, pamoic acid, and anthracenedicarboxylic acid. More preferably, the comonomer is at least one compound selected from the group consisting of isophthalic acid, naphthalenic diacid, succinic acid, adipic acid, phthalic acid, glutaric acid, oxalic acid, and maleic acid. Most preferably, the carboxylic acid compound is isophthalic acid.

Suitable hydroxy-functional compounds include alkylene glycols of the formula HO—R'—OH, a polyalkylene glycol having the formula HO—[R"—O—]$_n$—H, or combinations thereof, wherein R' is an alkylene group, linear or branched, having 3 to about 10, preferably 3 to 4 carbon atoms, and wherein R", being the same or different, is an alkylene group having 1 to about 10, preferably 1 to 5 carbon atoms. Suitable examples of the alcohol-based compound include aliphatic glycols such as 1,2-propylene glycol, 1,3-propylene glycol, diethylene glycol, triethylene glycol, 1,2-butylene glycol, 1,3-butylene glycol, 2,3-butylene glycol, 1,4-butylene glycol, 1,5-pentanediol, neopentyl glycol, 1,6-hexanediol, 1,2-cyclohexanediol, 1,3-cyclohexanediol, 1,4-cyclohexanediol, 1,2-cyclohexanedimethanol, 1,3-cyclohexanedimethanol, 1,4-cyclohexanedimethanol, 1,4-cyclohexanediethanol, 1,10-decamethylene glycol, 1,12-dodecanediol, polyethylene glycol, polytrimethylene glycol, and polytetramethylene glycol; and aromatic glycols such as hydroquinone, 4,4'-dihydroxybisphenol, 1,4-bis(β-hydroxyethoxy)benzene, 1,4-bis(β-hydroxyethoxyphenyl)sulfone, bis(p-hydroxyphenyl) ether, bis(p-hydroxyphenyl)sulfone, bis(p-hydroxyphenyl) methane, 1,2-bis(p-hydroxyphenyeethane, bisphenol A, bisphenol C, 2,5-naphthalenediol, and glycols obtained by adding ethylene oxide to these glycols. Preferably, the hydroxyl-functional comonomer is at least one compound selected from the group consisting of diethylene glycol, 1,3-propylene glycol, 1,4-butylene glycol, and 1,4-cyclohexanedimethanol. More preferably, diethylene glycol and/or 1,4-cyclohexanedimethanol is used in the process according to the invention.

Small amounts of polyhydric alcohols may also be used as comonomer. Suitable examples of polyhydric alcohols are trimethylolmethane, trimethylolethane, trimethylolpropane, pentaerythritol, glycerol, and hexanetriol. Hydroxycarboxylic acids may also be used in combination. Examples of suitable hydroxycarboxylic acids include lactic acid, citric acid, malic acid, tartaric acid, hydroxyacetic acid, 3-hydroxybutyric acid, p-hydroxybenzoic acid, p-(2-hydroxyethoxy) benzoic acid, 4-hydroxycyclohexanecarboxylic acid and their ester-forming derivatives. Also, cyclic esters in combination may be used in present invention. Examples of cyclic esters include δ-caprolactone, β-propiolactone, β-methyl-β-propiolactone δ-valerolactone, glycollide, and lactide.

In a preferred way of operating the process according to the invention, a PET is made that contains 0.5-5 mol % of at least one comonomer selected from the group consisting of isophthalic acid, diethylene glycol and 1,4-cyclohexanedimethanol. More preferably, a PET is made containing 1-4 mol % of said at least one comonomer.

The process according to the invention may be performed batch-wise or as a continuous process; as is known in the art.

The process according to the invention comprises a step a) of esterifying EG and PTA and optionally comonomer to form diethylene glycol terephthalate and oligomers (DGT). This step can be performed in various ways and under conditions as known from the art. Typically, this step involves initially making a mixture of the EG, PTA, comonomer, catalyst components, and other additives such as colour correcting agents like cobalt compounds and other soluble colourants. EG is typically applied in a molar excess to PTA, for example EG/PTA molar ratio may be from 1.1 to 3.0, preferably 1.5-2.0. This excess EG is later removed during polycondensation. The initial mixture is typically not a solution but a paste or slurry. In addition to preparing the mixture in a separate slurry tank, the esterification step may be performed in one or more esterification tanks or reactors, in which the mixture is heated to temperatures in the range 200-300° C., preferably 230-270° C., at a pressure of about 0.1-10 MPa. Nitrogen is preferably used to prevent oxidation. Water formed in the reaction is removed from the system. Esterification results in a mixture of diethylene glycol terephthalate and various oligomers, together referred to as DGT.

In step b) of the process according to the invention the obtained DGT mixture is further reacted in one or more reactors operated at elevated temperatures, for example in the range 240-300° C., preferably at 270-290° C.; under reduced pressure or with an inert gas stream to facilitate removal of formed EG, water, alcohols, aldehydes or other reaction products. This melt-phase polycondensation or polymerisation step is typically operated at a pressure of 50-500 Pa, preferably at about 100 Pa to form a precursor polyester typically having an intrinsic viscosity of about 0.5 to about 0.7 dL/g, preferably 0.60 to 0.65 dL/g.

After the polycondensation step, the polyester formed may be directly extruded into fibres, filaments, films or strands by employing any method known in the art, such as melt-spinning. Such polyester fibres may be used as industrial or textile fibres for clothing, tire cords, ropes, civil engineering and construction applications, in the form of yarns, woven or non-woven fabrics, knitted products, nets, and the like. PET sheets can be applied for photographic films or for thermoformable packaging.

Alternatively, the process according to the invention further comprises subsequent steps of c) forming the polyester into pellets, d) crystallising the pellets, and e) solid-state polycondensing the polyester. Such a sequence of steps will result in a PET in pellet form that can be easily handled and further processed, and having an intrinsic viscosity of at least about 0.7 dL/g, preferably IV of about 0.7-1.5 dL/g, more preferably about 0.75-0.85 dL/g. Such higher IV, that is a higher molar mass, results in a polyester product with a better combination of properties, especially increased mechanical properties that can meet the stringent requirements for bottles.

Granulating or pelletizing the PET in step c) can be done by applying any known method, and may result in pellets of varying size and shape. In step d), the generally amorphous pellets are first crystallized by heating slowly to a temperature between the crystallisation temperature and crystalline melting point of the polyester, in order to prevent agglomeration of pellets during the subsequent step e) of solid-state polycondensation (SSP). The SSP step may be conducted at a temperature between the glass transition temperature and the melting point of the polyester, preferably at a temperature in a range of about 180 to 220° C., under reduced pressure or by passing an inert gas stream, preferably a nitrogen stream, over a bed of pellets or granules. Various solid stating processes are known in the art; such processes are for instance described in U.S. Pat. No. 4,064,112 and U.S. Pat. No. 4,161,578. The polyester obtained by applying the solid-state polycondensation step is particularly suitable for producing hollow moulded articles, such as tubes, pipes, and containers; using for example an extrusion moulding or an injection-moulding apparatus.

In a PET production process as described above, EG formed is removed from the reaction mixture during the polycondensation step, such that the equilibrium reaction will proceed. The EG removed, also referred to as spent glycol, is preferably re-used or recycled in the process for efficiency and cost control reasons. In DE19537930 a continuous process for making polyesters like PET is described, wherein the EG distilled off is used—after removal of water and other low boiling point components—in the initial paste making step in combination with fresh or virgin EG and phosphoric acid (or a glycol ester thereof). In this process, the metal catalyst—based on Sb, Ti, Ge, Sn, Zn, Mn or mixtures thereof—is only to be added after 65-80% of the total esterification time has elapsed to control optical properties of the PET. U.S. Pat. No. 4,146,729 relates to a continuous direct esterification process for PET, wherein removed EG is recovered for re-use in the slurry making step by applying a rectification column. In WO9916537 the use of cross-flow membrane filtration is proposed as alternative to distillation steps in order to purify spent glycol and make it suited for recycling to paste making. In WO2004076513 it is taught that improved colour and clarity of PET results if spent EG is purified by hydrogenating impurities in the glycol before re-using it in the process.

The process according to the invention has the additional advantage that PET can be obtained showing a neutral colour and high optical clarity, also if EG formed in polycondensation step b) is separated and again applied in the process. The EG formed is preferably distilled off from the reactor or reactors applied, and returned to step a), preferably to a paste making step that forms part of step a). The process may optionally include steps of further purifying the EG distilled-off as known in the art, but preferably the distilled EG is fed to step a) without additional purification or post-reaction steps. The invention thus also specifically relates to a process as defined above, wherein EG removed from polycondensation step b) is recycled back to esterification step a).

The catalyst system used in the process according to the invention substantially consists of 70-160 ppm of Sb-compound, 20-70 ppm of Zn-compound and 0.5-20 ppm of Ti-glycolate as active catalyst components (ppm metal based on PET), which is within the context of this application understood to mean that these are the dominant components that affect the rate of esterification and polycondensation reactions occurring.

A (mixed) metal catalyst is, however, also known to affect some degradation reactions. For this reason a P-compound may be further contained in the catalyst system, which compound acts as thermal stabiliser to reduce degradation reactions that lead to polymer discolouration in particular. This is common practice also in other catalyst systems used for polyester production. Typically, such P-compound is added in prior art after step a), that is, at the end of esterification.

In addition to Sb-, Zn-, and Ti-compounds there may be also other metal components present in the process according to the invention, which could act as a catalyst, but then at such low concentrations that their influence is hardly noticeable. Examples of such components include Co-compounds, which are added at low concentration (typically <20 ppm Co based on polyester) to correct the slightly yellow colour of the polyester rather than to increase reaction rate.

The catalyst system used in the process according to the invention contains a Sb-compound. Suitable antimony compounds include Sb(III) and Sb(V) compounds as recognized in the art as being a polycondensation catalyst, preferably those that are soluble in EG. Examples of suitable compounds include antimony triacetate, antimony trioxide, antimony tricarbonate, antimony glycolates and mixtures thereof. The Sb-compound is added in an amount resulting in 70-160 ppm Sb based on PET mass, preferably at least 80, 90, 100, 110 or 120 ppm, and preferably at most 155, 150, or 145 ppm of Sb is added.

The catalyst system used in the process according to the invention further contains 20-70 ppm of a Zn-compound. Suitable zinc compounds include the compounds as recognized in the art as being a polycondensation catalyst, preferably those that are soluble in EG. Examples of suitable compounds include zinc diacetate, zinc oxide, zinc carbonate, zinc peroxide, zinc hydroxide, zinc halide, zinc sulphide, zinc glycolate, and mixtures thereof. The Zn-compound is added in an amount resulting in 20-70 ppm Zn based on PET mass, preferably at least 25 or 30 ppm, but preferably at most 65, 60, 55, 50 or 45 ppm of Zn is added, to arrive at a balance between catalyst activity and suppression of side-reactions like AA generation.

It is known that for metals such as Sb and Zn any of their respective compounds, provided they are sufficiently soluble in EG, can be used as catalyst component and provide similar activity based on amount of elemental metal. However, for titanium compounds, such simple behaviour is not found; and one cannot predict a priori the catalytic performance of various Ti compounds, e.g. by calculating the moles or ppm of elemental Ti that is added. In addition some titanium compounds, such as $TiCl_4$ and Ti-alkoxides, may react with water formed during PET polymerisation to form non-catalytic species. Further problems known to be associated with Ti-compounds as catalyst for PET include significant yellowing and sluggish catalytic performance during SSP.

The catalyst system used in the process according to the invention further contains 0.5-20 ppm of Ti added as Ti-glycolate. Ti-glycolate is believed to have a polymeric structure of formula $[TiO_4(CH_2)_4]_n$ wherein n can have a value of from 1 to 200, with four glycolate units bound to every Ti atom. Ti-glycolate can be synthesized according to known methods, for example by reacting a titanium alkoxide (eg Ti-butylate) with excess ethylene glycol, at elevated temperature (eg at about 160° C.) under inert atmosphere (eg nitrogen). Use of such compound in PET preparation is for example described by R. Gutman et al., in Textile Praxis International 1, 1989, p. 29-33. Unlike many other organotitanium compounds like alkoxides, Ti-glycolate is stable to hydrolysis by moisture and conversion to catalytically inactive $TiO_2$. However, the melt polycondensation rate obtained with Ti-glycolate as catalyst is only comparable to antimony, and further disadvantages include insolubility in EG, a pronounced yellow colour of the resulting PET, and little reactivity in solid-state postcondensation; thus precluding practical application as such. Gutman et al. showed that some of the disadvantages of using Ti-glycolate alone can be overcome by adding sodium glycolate; then the catalyst becomes soluble in EG, and a melt polycondensation rate similar to a standard antimony catalyst can be obtained, but the SSP rate is markedly lower. It was thus very surprising that the mixed metal catalyst of the current invention comprising minor amounts of Ti-glycolate shows such favourable catalytic performance, both in esterification and in melt- and solid state-polycondensation. The Ti-compound is preferably added in an amount resulting in at least 1.0 or 1.5 ppm of Ti, based on PET mass, but preferably Ti-content is at most 15, 12, 10, 9, 8, 7, 6, 5, 4 or even 3 ppm, to arrive at an optimum balance between catalyst activity, suppression of side-reactions like AA generation, and a neutral colour.

In a preferred way of operating the process according to the invention the catalyst system substantially consists of 120-145 ppm of Sb, 30-45 ppm of Zn, and 1.0-4.0 ppm of Ti (elemental contents based on PET). In a further preferred way of operating the process according to the invention the catalyst system substantially consists of 130-140 ppm of Sb, 35-45 ppm of Zn, and 1.0-3.0 ppm of Ti.

The total amount of metal components in the catalyst system applied in the process according to the invention is preferably less than 200 ppm, more preferably less than 195, 190, or 185 ppm. In order to have high activity and productivity, total metal content resulting from the catalyst in PET is preferably at least 130, 135, 140 or 145 ppm.

The catalyst system used in the process according to the invention may further contain a P-compound. Suitable phosphorous compounds include the compounds as recognized in the art as being a stabilizing compound in polyester. Examples of suitable compounds include phosphoric acid, phosphorous acid, polyphosphoric acid, phosphate esters like triethyl phosphate or tributyl phosphate and mixtures thereof. Preferably, phosphoric acid is used, which results in good polycondensation reactivity and good thermal stability of PET, in addition to being a convenient and inexpensive additive that is also allowed for food-contact applications. The P-compound is typically added in an amount resulting in 5-100 ppm P based on PET mass, preferably at least 10, 12 or 14 ppm P is used, but preferably less than 80, 60, 50, 40, 30, or 25 ppm. The advantage of such concentration is to retain a high polycondensation rate also in solid state, but to lower rate of acetaldehyde formation in the PET, especially regeneration during processing in the melt.

In the process according to the invention, the components of the catalyst system, essentially consisting of Sb-, Zn- and Ti-compounds, can be added together in step a), but one or more components can also be added in part or completely later during the esterification. Preferably, the metal compounds are added together with the raw materials PTA and EG and optionally other additives to the paste making step that forms part of step a). The P-compound is preferably added at the end of the esterification step a), for example just before or during transferring the DGT mixture to a subsequent reaction vessel for performing the polycondensation step b), or at the beginning of the polycondensation step b).

In a preferred embodiment of the process according to the invention, the catalyst system essentially consists of 120-145 ppm Sb, 30-45 ppm Zn, 1-4 ppm Ti, and 10-50 ppm P (elemental contents based on PET), more preferably of 130-140 ppm Sb, 35-45 ppm of Zn, 1-3 ppm Ti, and 10-30 ppm of P.

Preferably, in the process according to the invention, the catalyst components are added as Sb-triacetate, as Zn-diacetate, as Ti-glycolate and as phosphoric acid.

In the process according to the invention, also other common additives may be added if desired. Such additives can include colourants, preferably those soluble in PET, to either adjust or correct the natural colour of the PET to a more neutral tone, or to result in a desired colour, like light blue. Colour correcting agents include cobalt-compounds, and/or organic toners like blue or red toners, such as described in U.S. Pat. No. 5,372,864 or U.S. Pat. No. 5,384,377. Other suitable additives include heat-stabilizers, anti-oxidants, reheating aids, anti-blocking agents, lubricants, acetaldehyde scavenging agents, and the like. The amount of said additives may vary up to several mass percentages, but is generally kept as low as possible, for example at most 5, 4, 3 or 2 mass %.

The process according to the invention can be operated in known reactors, as known to a person skilled in the art and described in a.o. above cited references.

The invention also relates to PET obtained by the process according to the invention. Preferably, the PET according to the invention contains 0.5-5 mol % of at least one comonomer selected from the group consisting of isophthalic acid, diethylene glycol and 1,4-cyclohexanedimethanol, and 120-145 ppm Sb, 30-45 ppm Zn, 1-4 ppm Ti, and 10-50 ppm P (elemental contents based on PET) as catalyst residues. More preferably, the PET contains 1-4 mol % of at least one comonomer selected from the group consisting of isophthalic acid, diethylene glycol and 1,4-cyclohexanedimethanol, and 130-140 ppm Sb, 35-45 ppm Zn, 1-3 ppm Ti, and 10-30 ppm of P as catalyst residues.

The PET obtained with the process according to the invention can be used in forming a great variety of articles for many different applications, including fibres, tubes, profiles, sheets, and packaging articles like thermoformed trays, and stretch-blow moulded containers or bottles from injection moulded preforms.

The invention will now be further elucidated with the following experiments.

Methods

Intrinsic Viscosity

The intrinsic viscosity or IV is a measure of the molecular mass of the polymer and is measured by dilute solution viscosimetry. All IVs were measured in a 3:2 mixture of phenol-1,2 dichlorobenzene solution, at 25° C., and expressed in dL/g (deciliter per gram). Typically, about 8-10 chips were dissolved to make a solution with a concentration of about 0.5 g/dL, and IV was calculated from the measured relative viscosity $\eta_r$ of this solution by using the Billmeyer equation shown below (see F. W. Billmeyer, J. of Polymer Sci. 1949 IV, 83; this equation is valid for the range c=0.5-0.65 g/dL).

$$IV=[\eta]=0.25(\eta_r-1+3 \ln \eta_r)/c.$$

Colour

The colour parameters were measured with a HunterLab ColorFlex Model No 45/0, serial no. CX 0969. Amorphous chips were used without grinding or crystallisation, in the transparent state. Generally, the changes measured could also be seen by eye. The colour of the transparent amorphous chips was categorized using the CIE tri-stimulus L*, a* and b* values. The L* indicates the brightness of the samples, with a high value signifying high brightness. L*=100 stands for perfectly white; L*=0 is perfectly black. The a* value indicates the green-red contrast (− value indicates greenness; + value indicates redness); the b* value indicates blue-yellow contrast (− value indicates blue; + indicates yellow). The measurement of colour of the PET after SSP was on done the chips as obtained. The L* values after SSP are higher because of whitening caused by spherulitic crystallisation of the polymer.

Haze

Haze on blown bottles was measured on panels of about 3 cm diameter and 0.238 mm thickness, cut from virtually flat parts of a 1.5 L bottle made from a 32 g perform, using a Haze Gard Plus (BYK Gardner). Haze is the percentage of transmitted light that after passing through the sample is scattered by more than 2.5° (ASTM D-1003-97). Values are reported as % haze normalized to the sample thickness (%/mm, or % haze per mm of sample thickness).

COOH End Groups

The PET was dissolved in a mixture of o-cresol and chloroform, under reflux conditions. After cooling to room temperature, the COOH end groups were determined using potentiometric titration with ethanolic KOH solution, under a nitrogen atmosphere. The results are expressed in mVal of COOH/kg of PET (milli equivalent of COOH per kg of PET).

Residual Acetaldehyde (AA) in Chips

The AA was measured by Headspace Gas Chromotography (GC), after cryogenic grinding of the polymer chips into a powder. 1 g of the powder was placed in a GC vial. The standard headspace-method was used for residual AA in resins, and involved heating the vial at 150° C. for 90 minutes, before injection in the GC column. The GC was calibrated with aqueous solutions of acetaldehyde of known concentrations.

Acetaldehyde Regeneration on Melting of SSP Polymer

The AA regenerated when the chips are melted is a most important property for bottle grade chips, and a test was devised that reflects the trend in AA regeneration if preforms are injection moulded (e.g. in case not enough material is available for preform making). The absolute values of the AA from this test may be higher than the AA in the preforms, but any AA regeneration difference between two samples made with different catalysts can be identified even with a few grams of material. The AA regeneration test involved (1) cryogenically powdering the SSP polymer pellets; (2) drying the powder for 55 minutes at 170° C. in a vacuum; (3) melting the dried powder in a melt viscometer at 280° C. for 4 minutes; using a die insert without a hole, with a nitrogen blanket; (4) removing the die insert and pushing out the molten blob with a rod, into a beaker of cold water; (5) cutting and cryogenically grinding the solidified blob; (6) using 1 g of the ground extrudate powder in a gas chromatography (GC) vial and measuring AA by the Headspace GC method (90 minutes at 150° C.).

Preform and Bottle Making

PET pellets after solid-stating, were first dried to <50 ppm moisture in a Piovan dryer. Then 32 g preforms were injection moulded on a 2-cavity Husky LX160PT machine at 273-275° C. Subsequently, the preforms were stretch-blow-moulded into 1.5 L bottles on a Sidel SBO 1 Labo machine using standardised processing conditions.

Synthesis of Polyesters

Comparative Experiments A

In these experiments Ti-glycolate alone was used as the catalyst, which was made as follows: a 500 ml three-necked flask with stirrer, gas inlet for nitrogen and distilling connection tube was filled with 68.0 g (0.2 mole) of Ti-butylate and 124.2 g (2.0 mole) of ethylene glycol. This clear solution was mixed by stirring for 5 min and heated under a slow flow of nitrogen to 160° C. (oil bath temperature). While heating, a white solid started to precipitate. N-butyl alcohol, which is formed during the reaction, is distilled off. The reaction time was about 9 h. The temperature of the oil bath was increased to 180° C. to get the theoretical amount of n-butyl alcohol, which was 59.3 g (0.8 mole). The flask was closed with stoppers, and reaction mixture was cooled over night. 100 ml of ethyl acetate were added to that mixture and stirred for 5 min. The solid was filtered and washed with 50 ml of ethyl acetate. The product was dried in a desiccator over phosphorus (V) oxide and afterwards for 3 h under vacuum (0.1 mbar) at 60° C. The yield was 33.5 g (0.199 mole/99.7%). Unlike other organo-titanium compounds, the Ti-glycolate was not susceptible to moisture and was hence very stable for handling. However, the Ti-glycolate was found to be insoluble in hot EG, which may hamper dispersion during PET polycondensation.

Elementary analysis revealed 28.6% carbon and 4.9% hydrogen, suggesting a 5-ring chelate complex structure with bridges between 2 Ti-atoms, leading to an extended polymeric structure. For an alternative non-chelate structure, 32.9% for carbon and 6.9% for hydrogen would have been found. Thermogravimetric analysis supported the first structure. At calcination temperatures above 350° C., the Ti-glycolate converts to Ti-dioxide, which is not eliminated. Ti-glycolate yields on calcination 47.5% of Ti-dioxide and 52.5% of other compounds, which are eliminated (volatilised) in the analyser; this is consistent with the first structure. The Ti glycolate has a polymeric structure with four glycolate units bound to every Ti atom. For the calculation of ppm of Ti, the formula weight for Ti glycolate was taken as 168 g/mole.

For the evaluation of PET polycondensation with Ti-glycolate alone, a conical reaction vessel was filled with 766.5 g of PTA, 11.6 g IPA, 374.3 g EG, and different amounts of Ti-glycolate and optionally other components (Co-diacetate tetrahydrate (also simply Co-acetate) and Estofil Blue toner, as colour correcting agents; phosphoric acid, as stabilizing compound), and was heated to about 200° C. in 15 minutes. The valve of the distillation column was closed and the temperature increased to 230° C. in 60 min., developing a pressure of about 0.7 MPa. The distillation column was heated to 120° C., and esterification was done during about 1 hour. Then pressure was reduced to atmospheric in steps during about 90 min, during which time water was collected in a receiver. If needed, the reaction was continued under atmospheric conditions until desired amount of water was collected. Pre-polycondensation was then carried out during 30 min at 1 kPa and 260° C., followed by polycondensation at 275° C. and reduced pressure of below 10 Pa. The polyester melt was then discharged by applying nitrogen pressure on the reactor as a strand that was quenched in a water bath, and chopped into transparent pellets.

A control experiment included using Sb-triacetate as catalyst, some results are summarised in Table 1. From these tests it can be seen that Ti-glycolate when used alone is not a very active as catalyst for PET, and results in a yellow(ish) product (Table 1, CE A-b, colour b*=8.7), compared to using Sb. The yellowing can be reduced by decreasing the Ti content, but this increases the polycondensation time (see Table 1, CE A-c), so there is no benefit over antimony. Addition of phosphoric acid or cobalt compounds, typical additives used in PET for thermal stabilisation and yellowness correction, significantly prolongs polycondensation and/or esterification time (see Table 1, CE A-d to CE A-i). It was further observed that the IV of PET made with Ti-glycolate alone only marginally increased when pellets were subjected to SSP.

TABLE 1

| Experiment | Catalyst/additives | Observations |
|---|---|---|
| CE A-a | 105 ppm Sb | 99 min. polycondensation; IV 0.57 dL/g; L* 81.1, a* −1.9; b* −0.8 |
| CE A-b | 75 ppm Ti | 98 min. polycondensation; IV 0.56 dL/g; L* 87.4, a* −1.3; b* 8.7 |
| CE A-c | 5.7 ppm Ti | 146 min. polycondensation; IV 0.57 dL/g; L* 83.9, a* −2.1; b* 2.2 |
| CE A-d | 25 ppm Ti; 15 ppm Co; 2 ppm blue toner; 20 ppm P | Polycondensation unsuccesful after 2 hrs |
| CE A-e | 25 ppm Ti; 2 ppm blue toner; 20 ppm P | Polycondensation unsuccesful after 2 hrs |
| CE A-f | 25 ppm Ti; 20 ppm P | Polycondensation time 157 min. |
| CE A-g | 25 ppm Ti; 2 ppm blue toner | Polycondensation time 89 min. |
| CE A-h | 25 ppm Ti; 15 ppm Co; 2 ppm blue toner; 20 ppm P after esterification | Esterification time extended by 1 hr; Polycondensation time 268 min. |
| CE A-i | 25 ppm Ti; 15 ppm Co; 2 ppm blue toner; | Esterification time extended by 1 hr; Polycondensation time 93 min. |

Comparative Experiments B-D

Comparative experiment B made a PET with antimony alone and CE C with zinc alone. In all cases, two batches were made, the second one using 'spent glycol' from the first batch; to simulate the operation in a continuous plant, where the spent glycol is continuously recycled.

For CE B, a conical reaction vessel of 10 liter was filled with 2246 g of PTA, 41 g IPA, 1100 g EG, 1.633 g Sb-triacetate (254 ppm of Sb), 0.164 g of Co-diacetate tetrahydrate and 0.0053 g Estofil Blue toner, and made into a paste. This batch yields 2645 g of PET (comprising 1.55% of IPA); representing a standard PET bottle polymer grade for reference.

Esterification was conducted by heating to about 255° C. under nitrogen atmosphere, and the water formed was collected. When the amount of water formed indicated the desired degree of esterification, 0.195 g of phosphoric acid was added dissolved in some EG (28 ppm of P). Then the vessel was heated to 275° C. and pressure was reduced to about 100 Pa. Polycondensation was considered to start when the torque of the mechanical stirrer was observed to increase from the lowest readable value (0.3 Nm), and was continued until the torque reached a value of 13.5 Nm (which would correspond to PET of IV of about 0.64 dL/g based on earlier calibration experiments). Ethylene glycol liberated during polycondensation was condensed and collected. The polyester melt was then discharged (by applying nitrogen pressure on the reactor) as a monofilament strand that was quenched in a water bath and chopped into transparent pellets.

A second PET batch was then produced in the same way, but part of the virgin EG was replaced with the collected EG from the first batch; that is recycled EG was used. The PET made with antimony catalyst generally has a grey tint and this is reflected in the low value of L* (57.2) in Table 2, CE B. The amorphous PET chips now obtained were crystallized by heating at 170° C. for 1 hour, and then polycondensed in solid-state at 210° C. with a continuous nitrogen flow during 6 hours. The thus obtained white pellets were analyzed as indicated above; results are collected in Table 1 (CE B).

Following the above procedure Comparative experiment C was performed, but instead of Sb-triacetate, 2.276 g Zn-diacetate dihydrate (also simply called Zn-acetate) was added as catalyst.

Results collected in Table 2 show for zinc a shorter polycondensation time (of 57 minutes for CE C compared to 87 minutes for CE B). Although the ppm levels of the metals are similar, the shorter time is related to a higher molar amount of Zn vs Sb. It was also found, however, that the PET made with the zinc catalyst was not suitable for practical use because of its properties. The polymer had very high amount of COOH endgroups (69 mval/kg compared with 49 mvaL/kg for antimony polymer), resulting in poor hydrolytic and thermal stability (the IV dropped to 0.61 dL/g during reactor discharge, versus 0.64 dL/g for antimony PET), a lower IV after SSP and nearly three times the AA regeneration. Although L* was relatively high, visually a haze was apparent in the pellets, especially if recycled EG is used.

In CE D the same procedure was used to make a PET with a mixed Sb—Zn catalyst as known from EP1574539. This bimetallic catalyst showed an advantage in melt polycondensation time; but it was found that use of recycled EG as opposed to only virgin EG, results in PET showing unacceptable haze, in addition to almost double AA regeneration (compare CE D versus CE B, Table 2); precluding application of the PET in e.g. bottles.

Examples 1-2

Following the above procedure of CE B and C, experiments of Examples 1 & 2 were performed applying a combination of 0.455 g Sb-triacetate (70 ppm of Sb), 0.569 g Zn-diacetate (64 ppm of Zn), and 0.032 or 0.017 g Ti-glycolate (3.6 or 1.9 ppm Ti, respectively) as active catalyst components. Again two batches were made for each recipe, the second with spent glycol, and only the latter polymer is taken for property analysis.

The results collected in Table 2 indicate that with this trimetallic catalyst system, PET can be produced with relatively short polycondensation times; and the PET obtained has good optical properties (both colour and clarity) even if recycled EG is used. In addition, the PET shows good thermal stability, and good SSP rate. It can be seen that only very low amounts of Ti-glycolate have a marked effect, but colour and AA performance could be further improved.

Comparative Experiment E and Examples 3 and 4

Examples 1 and 2 were repeated, but now with higher Sb- and lower Zn-contents (Ex 3-4); and a bimetallic reference with the same amount of Sb and Zn was also made (CE E). The catalyst in CE E based on 140 ppm Sb and 40 ppm Zn shows too low melt polycondensation activity to reach the target IV of 0.64 dL/g, hence the experiment was stopped after 2 hours. Addition of minor amounts of Ti to such catalyst again results in marked improvements; see results for Ex 3 and 4 in Table 2.

Comparative Experiment F and Example 5

These experiments relate to scaling-up the recipe of Ex 4 to make 60 kg of PET. CE B and Example 4 were repeated (but with 2 mol % IPA as comonomer) on larger scale, to enable injection moulding of preforms and stretch-blowing of bottles and fully evaluate material performance and demonstrate applicability on an industrial scale. A 3-vessel batch reactor system was applied, having a slurry preparation tank, an esterification reactor, and a melt-polycondensation reactor; followed by a cooling bath and a multi-strand granulator. The slurry tank was charged with 50.7 kg PTA, 1.2 kg IPA, 24.6 kg (recycled plus virgin) EG, required amounts of Sb-triacetate, Zn-acetate and Ti-glycolate, 3.8 g Co-acetate and 0.04 g Estofil blue toner. After mixing the slurry was transferred to the esterification reactor. Reaction was performed at about 255° C. under nitrogen until the required amount of water had been collected, and the molten DGT was then pumped into the polycondensation reactor.

The esterfication time could be measured more precisely in this experimental set-up, because of better control of the distillation and separation of water and EG from the reactor (time to reach the theoretical amount of water is taken as the esterification time). In this way, it was established that the Sb—Zn—Ti glycolate catalyst composition of Ex 5 shows a shorter esterification time than CE F, made with 254 ppm of antimony (see Table 3). For polycondensation, the temperature was raised to 275° C. and pressure reduced to about 100 Pa, with stirring. When a torque level equivalent to the setpoint IV of 0.58 dL/g was reached, the polyester was discharged as multiple strands, cooled and pelletised. Three consecutive batches were made without interruption—simulating a continuous plant-, wherein EG collected from batch 1 was used in batch 2, likewise for batches 2 and 3. Batch 3 was further tested: first the pellets were crystallized and solid-stated (in a rotating drum reactor under vacuum, at about 150° C./7 hrs and 210° C./9 hrs, respectively). Then preforms were moulded and transparent bottles were formed.

The data collected in Table 3 confirm the findings of the above experiments: PET bottle polymer can be made using a Sb—Zn—Ti catalyst system with higher productivity, as shown in esterification, melt phase polycondensation and SSP, compared to a standard antimony catalyst. Further, the preforms and bottles made showed that the required critical properties were met.

TABLE 2

| Property | (unit) | CE B | CE C | CE D | Ex 1 | Ex 2 | CE E | Ex 3 | Ex 4 |
|---|---|---|---|---|---|---|---|---|---|
| PET batch size | (kg) | 2.6 | 2.6 | 2.6 | 2.6 | 2.6 | 2.6 | 2.6 | 2.6 |
| Sb-content | (ppm) | 254 | 0 | 140 | 70 | 70 | 140 | 140 | 140 |
| Zn-content | (ppm) | 0 | 256 | 128 | 64 | 64 | 40 | 38 | 38 |
| Ti-content | (ppm) | 0 | 0 | 0 | 3.6 | 1.9 | 0 | 3.6 | 1.9 |
| Total metal content | (ppm) | 254 | 256 | 268 | 138 | 136 | 180 | 182 | 180 |
| P-content | (ppm) | 28 | 15 | 15 | 20 | 20 | 15 | 20 | 20 |
| polycondensation time | (min) | 87 | 57 | 60 | 58 | 61 | >120 | 58 | 72 |
| IV | (dL/g) | 0.64 | 0.61 | 0.63 | 0.63 | 0.63 | 0.55 | 0.62 | 0.65 |
| residual AA (before SSP) | (ppm) | 80 | 200 | 166 | 101 | 113 | | 102 | 93 |
| COOH | (mval/kg) | 48.5 | 69 | 50.7 | | | | | |
| L* | | 57.2 | 65.6 | 65 | 63.9 | 60.9 | | 61.2 | 64.2 |
| b* | | −5.1 | −3.8 | −4.1 | 1.4 | 0.7 | | −6.5 | −7.2 |
| IV | (dL/g) | 0.77 | 0.72 | 0.81 | 0.79 | 0.81 | 0.69 | 0.78 | 0.88 |
| AA regeneration | (ppm) | 12 | 30 | 22 | 21 | 21 | | 13 | 11 |
| L* | | 83.0 | 84.3 | 84.8 | 84.1 | 83.6 | | 82.2 | 84.3 |
| b* | | −3.3 | −1.3 | −2.5 | 3.3 | 1.3 | | −2.7 | −2.8 |

TABLE 3

| Property | (unit) | CE F | Ex 5 |
|---|---|---|---|
| PET batch size | (kg) | 60 | 60 |
| Sb-content | (ppm) | 254 | 140 |
| Zn-content | (ppm) | 0 | 38 |
| Ti-content | (ppm) | 0 | 1.9 |
| Total metal content | (ppm) | 254 | 180 |
| P-content | (ppm) | 17 | 16 |
| Esterification time | (min) | 202 | 174 |
| Polycondensation time | (min) | 127 | 90 |
| IV | (dL/g) | 0.58 | 0.58 |
| IV After SSP | (dL/g) | 0.74 | 0.73 |
| AA in preform | (ppm) | 5.0 | 4.9 |
| haze (bottle wall) | (%/mm) | 18.4 | 16.1 |

The invention claimed is:

1. Process for making polyethylene terephthalate (PET) from ethylene glycol (EG), purified terephthalic acid (PTA) and optionally up to 6 mol % comonomer, using a mixed metal catalyst system and comprising:
    a) esterifying EG and PTA to form diethylene glycol terephthalate and oligomers (DGT), and
    b) melt-phase polycondensing DGT to form PET and EG, wherein the catalyst system substantially consists of a Sb-compound, a Zn-compound and Ti-glycolate as active components, at concentration of 70-160 ppm Sb, 20-70 ppm Zn and 0.5-20 ppm Ti (ppm metal based on PET), and optionally a P-compound.

2. The process according to claim 1, wherein the comonomer is present in an amount of 0.5-5 mol %, and wherein the comonomers comprise at least one comonomer selected from the group consisting of isophthalic acid, diethylene glycol and 1,4-cyclohexanedimethanol is applied.

3. The process according to claim 1, further comprising subsequent steps of
    c) forming the polyester into pellets,
    d) crystallising the pellets, and
    e) solid-state polycondensing the polyester.

4. The process according to claim 1, wherein the PET obtained has IV of at least 0.7 dL/g.

5. The process according to claim 1, wherein EG removed from polycondensation step b) is recycled back to esterification step a).

6. The process according to claim 1, wherein the catalyst system substantially consists of 120-145 ppm Sb, 30-45 ppm Zn, and 1.0-4.0 ppm Ti (elemental contents based on PET).

7. The process according to claim 1, wherein total amount of metal components in the catalyst system is less than 190 ppm.

8. The process according to claim 1, wherein the catalyst system further comprises 10-50 ppm of a P-compound.

9. Process for making polyethylene terephthalate (PET) comprising:
   a) esterifying ethylene glycol (EG) and purified terephthalic acid (PTA) and at least 0.5 mol % comonomer to form diethylene glycol terephthalate and oligomers (DGT) in the presence of a mixed metal catalyst system, and
   b) melt-phase polycondensing DGT to form PET and EG, wherein the catalyst system substantially consists of a Sb-compound, a Zn-compound and Ti-glycolate as active components, at concentration of 70-160 ppm Sb, 20-70 ppm Zn and 0.5-20 ppm Ti (ppm metal based on PET).

10. The process according to claim 9, wherein the catalyst system substantially consists of 120-145 ppm Sb, 30-45 ppm Zn, and 1.0-4.0 ppm Ti (elemental contents based on PET).

11. The process according to claim 9, wherein the comonomer comprises a material selected from di-carboxylic acids and their ester-forming derivatives, polycarboxylic acids and their ester-forming derivatives, di-hydroxy compounds and their ester-forming derivatives, poly-hydroxy compounds and their ester-forming derivatives, and hydroxycarboxylic acids and their ester-forming derivatives.

12. The process according to claim 1, wherein the P-compound is present, and wherein the P-compound is added during transfer of the DGT to a subsequent reaction vessel for performing step b).

13. The process according to claim 1, wherein the P-compound is present, and wherein the P-compound is added at the beginning of step b).

14. Process for making polyethylene terephthalate (PET) from ethylene glycol (EG), purified terephthalic acid (PTA) and optionally up to 6 mol % comonomer, using a mixed metal catalyst system and comprising:
   a) esterifying EG comprising virgin EG and recycled EG and PTA to form diethylene glycol terephthalate and oligomers (DGT), and
   b) melt-phase polycondensing DGT to form PET and EG, wherein the catalyst system substantially consists of a Sb-compound, a Zn-compound and Ti-glycolate as active components, at concentration of 70-160 ppm Sb, 20-70 ppm Zn and 0.5-20 ppm Ti (ppm metal based on PET), and optionally a P-compound; and
   wherein the PET formed has an intrinsic viscosity (IV) of at least 0.7 dL/g.

15. The process according to claim 14, wherein the IV is from 0.75 to 0.85 dL/g.

16. The process according to claim 14, wherein the P-compound is added during transfer of the DGT to a subsequent reaction vessel for performing step b).

17. The process according to claim 14, wherein the P-compound is added at the beginning of step b).

18. The process according to claim 14, wherein the PET is made from the EG, and the comonomer.

* * * * *